United States Patent
Azuma et al.

(10) Patent No.: US 6,604,433 B1
(45) Date of Patent: Aug. 12, 2003

(54) ULTRASONIC TRANSDUCER AND ULTRASONIC FLOWMETER

(75) Inventors: Naoko Azuma, Kawasaki (JP); Akihisa Adachi, Kawasaki (JP); Masahiko Hashimoto, Tokyo (JP); Tooru Ninomiya, Yawata (JP); Kenzo Ohji, Ikoma (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/633,808

(22) Filed: Aug. 7, 2000

(30) Foreign Application Priority Data

Aug. 5, 1999 (JP) .............................. 11-222426

(51) Int. Cl.[7] ................................................. G01F 1/66
(52) U.S. Cl. .................................. 73/861.27; 73/861.28
(58) Field of Search ....................... 73/861.28, 861.18, 73/861.27, 861.29; 310/6

(56) References Cited

U.S. PATENT DOCUMENTS

| | | | | |
|---|---|---|---|---|
| 3,619,672 A | * | 11/1971 | Nagata et al. | 310/344 |
| 4,283,649 A | * | 8/1981 | Heinouchi | 310/322 |
| 4,556,814 A | * | 12/1985 | Ito et al. | 310/326 |
| 4,754,440 A | * | 6/1988 | Naruse | 181/148 |
| 5,288,551 A | * | 2/1994 | Sato et al. | 428/334 |
| 5,503,154 A | * | 4/1996 | Belef | 128/662.03 |
| 5,506,463 A | * | 4/1996 | Yoshimoto et al. | 310/344 |
| 5,650,571 A | * | 7/1997 | Freud et al. | 73/861.06 |
| 5,840,030 A | * | 11/1998 | Ferek-Petric et al. | 600/439 |
| 5,856,622 A | * | 1/1999 | Yamamoto et al. | 702/48 |
| 5,939,817 A | * | 8/1999 | Takado | 310/313 R |
| 5,990,597 A | * | 11/1999 | Takagi et al. | 310/323.04 |

FOREIGN PATENT DOCUMENTS

JP          3014801          6/1995

* cited by examiner

Primary Examiner—Edward Lefkowitz
Assistant Examiner—Lilybett Martir
(74) Attorney, Agent, or Firm—Parkhurst & Wendel, L.L.P.

(57) ABSTRACT

The present invention provides an ultrasonic transducer having uniform characteristics. Because the characteristics of a pair of ultrasonic transducer are equalized with each other, measuring accuracy of an ultrasonic flowmeter can be improved. Electrical connection from an electrode surface 13 of a piezoelectric body 11 to an external electrode is achieved not by soldering but by an electroconductive elastic body 16. As a result, variations of the frequency characteristics due to thermal load on the piezoelectric body 11 can be reduced, and this makes it possible to obtain an ultrasonic transducer with uniform characteristics, and measuring accuracy of an ultrasonic flowmeter using a pair of the ultrasonic transducer can be improved.

12 Claims, 6 Drawing Sheets

ULTRASONIC TRANSDUCER AND ULTRASONIC FLOWMETER

BACKGROUND OF THE INVENTION

1. Field of the Invention

The present invention relates to an ultrasonic transducer for transmitting and receiving ultrasonic pulses and also to a measuring instrument, to which the ultrasonic receiver/transmitter is applied.

2. Description on the Related Art

Figure 9:
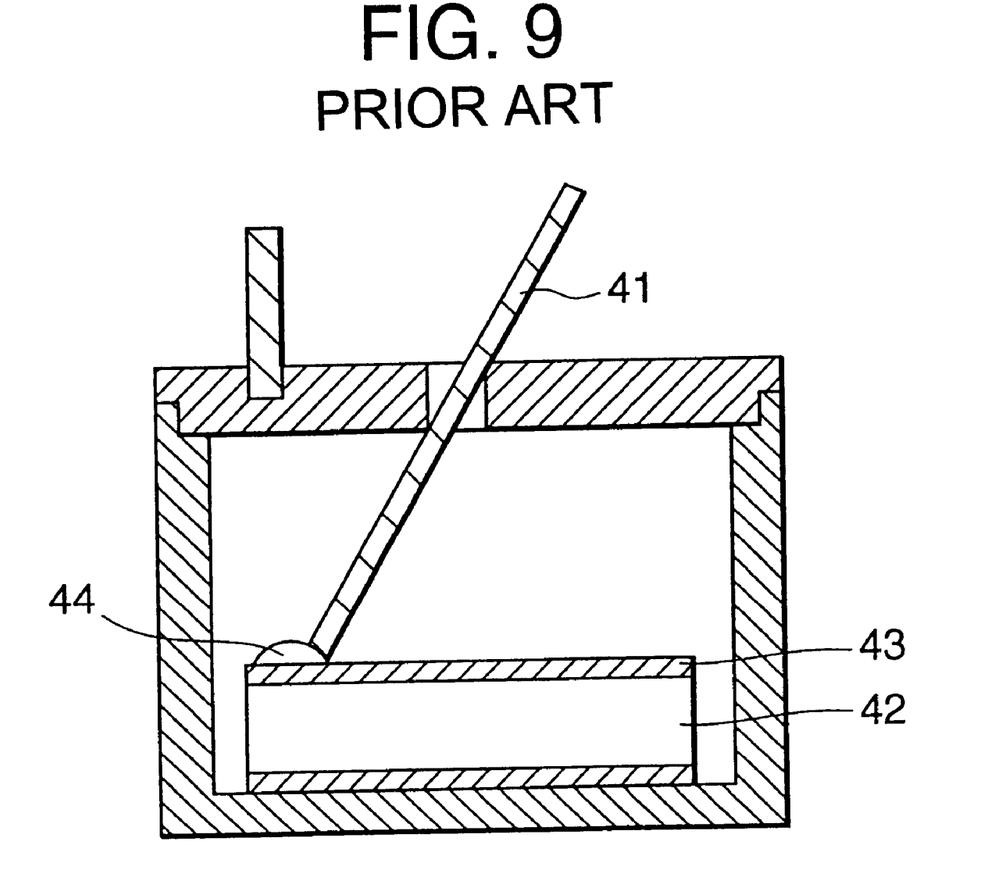
FIG. 9 is a cross-sectional view of a conventional type ultrasonic transducer.

In the past, an ultrasonic transducer has been commonly known as described in Japanese Utility Model Application 7-1793. As shown in FIG. 9 of the present application, in this ultrasonic transducer, electrical connection is achieved by soldering 44 a lead wire 41 to an electrode surface 43 of a piezoelectric body 42.

However, in the method for electrical connection of the conventional type ultrasonic transducer, there have been the following problems caused by soldering:

(1) Piezoelectric characteristics are deteriorated due to thermal load.

(2) Frequency characteristics are varied depending on the point of soldering or quantity of the solder used.

(3) Environmental load due to soldering.

SUMMARY OF THE INVENTION

The present invention has been made in order to solve the above-mentioned problems. To solve the above problems, one of the electrode surfaces of the piezoelectric body is electrically connected to the external electrode unit via an electroconductive elastic body.

According to the present invention, therefore, the elastic body is used for electrical connection by sandwiching and pressurizing the electroconductive elastic body. As a result no thermal load is applied on the piezoelectric body. The elastic body is softer and has lower sound impedance than solder, and mechanical load is decreased. This makes it possible to reduce variations in the characteristics of the elastic body and to equalize the characteristics of the ultrasonic transducer. In particular, in a measuring instrument such as ultrasonic flowmeter using a pair of ultrasonic transducer, the characteristics of the ultrasonic transducer can be easily equalized, and this contributes to the improvement of measuring accuracy. Further, environmental load can be reduced because soldering is not used.

The ultrasonic transducer according to a first aspect of the present invention comprises a piezoelectric body having electrode surfaces on two opposed surfaces, and an external electrode unit for transmitting an electric signal to the piezoelectric body, whereby one of the electrode surfaces of the piezoelectric body and the external electrode unit are electrically connected via an electroconductive elastic body, frequency characteristics are equalized with each other because there is no thermal load due to soldering, and environmental load can be reduced.

According to a second aspect of the present invention, the invention provides the ultrasonic transducer of the first aspect as described above, wherein there are provided two external electrode units, one of the electrode surfaces of a piezoelectric body is electrically connected to the other of the external electrode units via an electroconductive elastic body, and the other of the electrode surfaces of the piezoelectric body is electrically connected to the other of the external electrode units by bonding, whereby frequency characteristics are equalized with each other because there is no thermal loading due to soldering, and environmental load is reduced.

According to a third aspect of the present invention, the invention provides the ultrasonic transducer of the first aspect as described above, wherein there are provided two external electrode units, each of the electrode surfaces of the piezoelectric body is electrically connected to each of the external electrode units via an electroconductive elastic body, whereby environmental load due to soldering is reduced, variations in the frequency characteristics and transmitting/receiving sensitivity caused by variation in thickness of adhesive agent are reduced, and measurement can be performed with high accuracy.

According to a fourth aspect of the present invention, the invention provides the ultrasonic transducer of one of the first to the third aspects as described above, wherein the electrode surface of the piezoelectric body and the external electrode unit are electrically connected by sandwiching and pressurizing the electroconductive elastic body whereby variations of frequency characteristics can be reduced because there is no thermal load due to soldering, and an ultrasonic transducer can be easily assembled.

According to a fifth aspect of the present invention, the invention provides the ultrasonic transducer of one of the second to the fourth aspects as described above, wherein there is provided a terminal block having two electrically separated terminals, the two terminals are electrically connected to each of the external electrode units, and an ultrasonic transducer easily connectable with external device using lead wire can be obtained.

According to a sixth aspect of the present invention, the invention provides the ultrasonic transducer of the fifth aspect as described above, wherein there is provided means for preventing the electroconductive elastic body from moving in lateral direction, and disconnection due to the moving of the electroconductive elastic body can be prevented, and an ultrasonic transducer with high reliability can be obtained.

According to a seventh aspect of the present invention, the invention provides the ultrasonic transducer of the sixth aspect as described above, wherein the movement preventing means is a recess arranged on the terminal block, and the electroconductive elastic body and one of the external electrode units are arranged on inner side of the recess, and if the electroconductive elastic body is moved down into the recess, poor connection caused by the moving of the electroconductive elastic body in lateral direction can be prevented, and an ultrasonic transducer with high reliability can be obtained. Further, an ultrasonic transducer easy to assemble can be obtained because the moving of the electroconductive elastic body can be prevented.

According to an eighth aspect of the present invention, the invention provides the ultrasonic transducer of the sixth aspect as described above, wherein the means for preventing the moving of the electroconductive elastic body is a projection provided on the terminal block, the electroconductive elastic body and one of the external electrode units are arranged on inner side of the projection, and if the projection is arranged to prevent the electroconductive elastic body from moving, poor contact caused by the moving of the electroconductive elastic body in lateral direction can be prevented, and an ultrasonic transducer with high reliability can be obtained. Further, an ultrasonic transducer easy to assemble can be obtained because the moving of the electroconductive elastic body can be prevented by the projection.

According to a ninth aspect of the present invention, the invention provides the ultrasonic transducer of one of the second to the eighth aspects as described above, wherein the electroconductive elastic body comprises an electroconductive unit and an insulating unit, and electric short-circuiting of two external electrodes can be prevented by the insulating unit, and an ultrasonic transducer with high reliability can be obtained.

According to a tenth aspect of the present invention, the invention provides the ultrasonic transducer of the ninth aspect as described above, wherein the conductive unit and the insulating unit are arranged alternately in layers, and the outermost layers on both sides are insulating layers, electrical short-circuiting of the two external electrodes can be prevented by the insulating unit, trouble caused by electrical short-circuiting can be prevented, and an ultrasonic transducer easy to assemble and with high reliability can be obtained.

According to an eleventh aspect of the present invention, the invention provides the ultrasonic transducer of one of the first to the fourth aspects as described above, wherein at least one of the external electrode units has bending, and this increases the degree of freedom at the point where the external electrode is fixed, and an ultrasonic transducer easy to assemble can be obtained.

The ultrasonic flowmeter of a twelfth aspect of the present invention comprises a flowrate measuring unit a flowrate measuring unit where a fluid to be measured is flowing; a pair of ultrasonic transducer having a piezoelectric body having electrode surfaces on two opposed surfaces, and an external electrode unit for transmitting an electric signal to said piezoelectric body, one of the electrode surfaces of the piezoelectric body being electrically connected to the external electrode unit via an electroconductive elastic body, said pair of ultrasonic transducer being arranged on said flowrate measuring unit; a driving circuit for driving one of said ultrasonic transducer; a receiving detection circuit connected to the other of said ultrasonic transducer and for detecting ultrasonic pulse; a timer for measuring propagation time of said ultrasonic pulse; and an arithmetic unit for calculating flowrate from the output of said timer. As a result, the characteristics of a pair of ultrasonic transducer can be easily equalized, and an ultrasonic flowmeter with high measuring accuracy can be obtained.

BRIEF DESCRIPTION OF THE DRAWINGS

These and other objects and features will become more readily apparent from the following detailed description taken in conjunction with the attached drawings in which.

DETAILED DESCRIPTION OF THE PREFERRED EMBODIMENTS

Description will be given below on embodiments of the present invention referring to the drawings. In the figures, the component referred by the same symbol is the same as in the above, and detailed description is not given here.

(First Embodiment)

Figure 1:
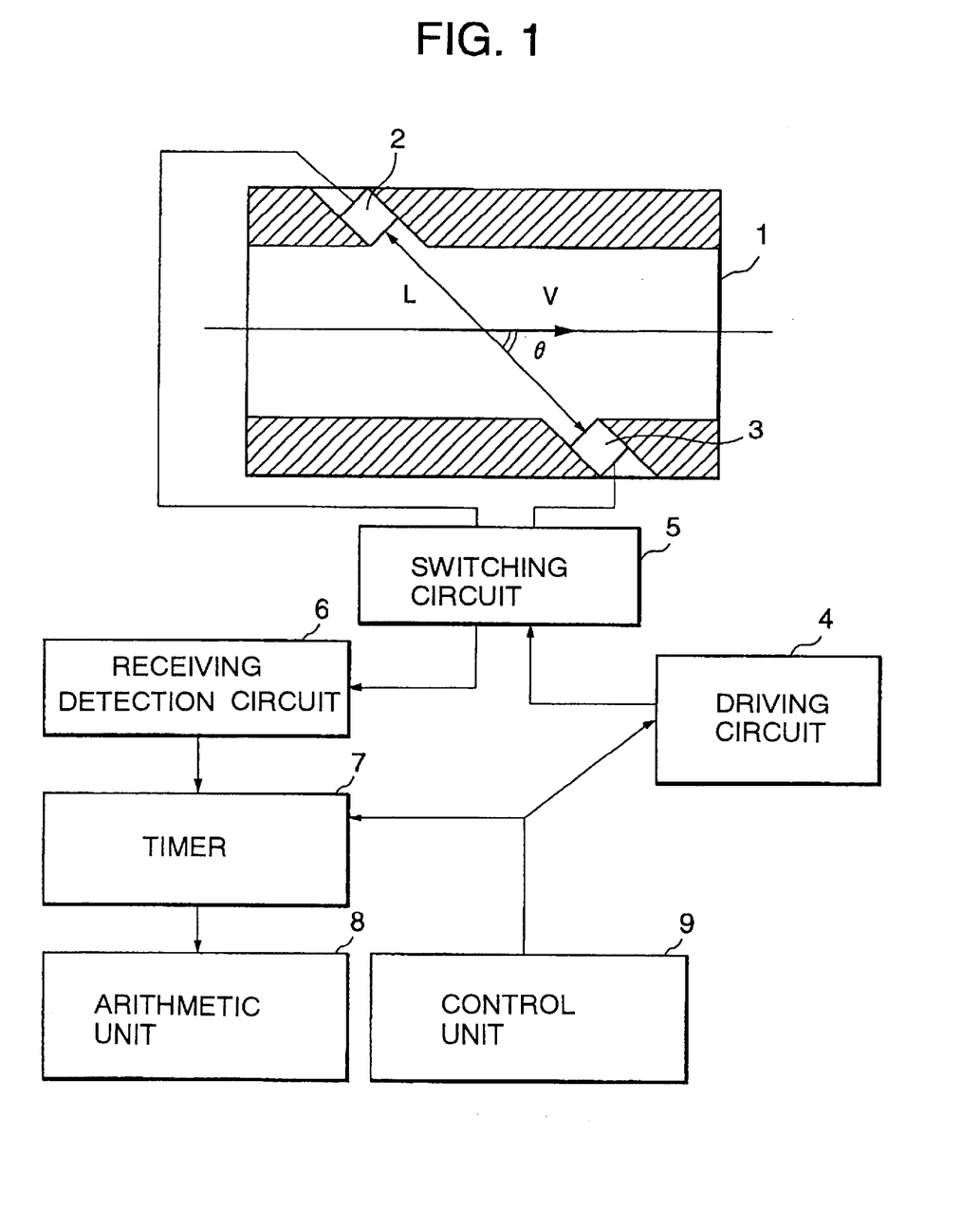
FIG. 1 is a block diagram of an ultrasonic flowmeter of an embodiment of the present invention.

FIG. 1 is a block diagram of an ultrasonic flowmeter of an embodiment of the present invention. The ultrasonic flowmeter shown in FIG. 1 comprises a flowrate measuring unit 1 where a fluid to be measured is flowing, ultrasonic transducers 2 and 3 arranged respectively at positions opposite to the flowrate measuring unit 1 and used for transmitting and receiving ultrasonic wave, a driving unit 4 for driving the ultrasonic transducers 2 and 3, a switching circuit 5 for switching over the ultrasonic transducers 2 and 3, a receiving detection circuit 6, a timer 7 for measuring propagation time of ultrasonic pulses, an arithmetic unit 8 for calculating flowrate from the output of the timer 7, and a control unit 9 for outputting control signals to the driving circuit 6 and the timer 7.

First, operation and functions are described. Here, it is supposed that the fluid to be measured is LP gas, for example, and that driving frequency of the ultrasonic transducer 2 and 3 is about 500 kHz. At the control unit 9, a transmission start signal is outputted to the driving unit 4, and at the same time, the measurement of time by the timer 7 is started. When the driving unit 4 receives the transmission start signal, it drives the ultrasonic transducer 3, and ultrasonic pulse is transmitted. The ultrasonic pulse thus transmitted is propagated in the flowrate measuring unit and is received by the ultrasonic transducer 2. When ultrasonic pulse is received, the pulse is converted to an electric signal by the ultrasonic transducer 2, and it is outputted to the receiving detection circuit 6. The receiving detection circuit 6 determines the timing to receive the receiving signal. The timer 7 is stopped, and propagation time t1 is calculated at the arithmetic unit 8.

Then, the ultrasonic transducer 2 and 3 connected to the driving unit 4 and the receiving detection circuit 6 are switched over. At the control unit 9, a transmission start signal is issued to the driving unit 4, and time measurement by the timer 7 is started. In contrast to the measurement of the propagation time t1, the ultrasonic pulse is transmitted by the ultrasonic transducer 2, and it is received by the ultrasonic transducer 3. Then, the propagation time t2 is calculated at the arithmetic unit 8.

Here, it is assumed that a distance between the centers of the ultrasonic transducer 2 and 3 is L, sound velocity in LP gas when no wind is blowing is C, flow velocity in the flowrate measuring unit 1 is V, and angle between the flowing direction of the fluid to be measured and the center of the ultrasonic transducer 2 and 3 is $\theta$. Then, the values of the propagation time t1 and t2 can be expressed by the equations (1) and (2). If the sound velocity C in the fluid to be measured is eliminated from the equations (1) and (2), the flow velocity V is obtained by the equation (3). Because the value of L is already known, the flow velocity V can be calculated if the values of t1 and t2 are measured.

$$t1 = \frac{L}{C + V\cos\theta} \quad (1)$$

$$t2 = \frac{L}{C - V\cos\theta} \quad (2)$$

$$V = \frac{L}{2\cos\theta}\left(\frac{1}{t1} \frac{1}{t2}\right) \quad (3)$$

However, time differences between t1 and t2 is very little when the flow velocity V is slow, and it is difficult to measure accurately. For this reason, averaging method to repeat the measurement by N times or sing-around method is adopted to improve the accuracy to measure the propagation time such as t1 or t2, and the accuracy to measure the flow velocity is increased. Here, if it is supposed that area of the flowrate measuring unit 1 is S and correction factor is K, the flowrate Q can be calculated by the equation (4):

$$Q = KSV \quad (4)$$

Figure 2A:
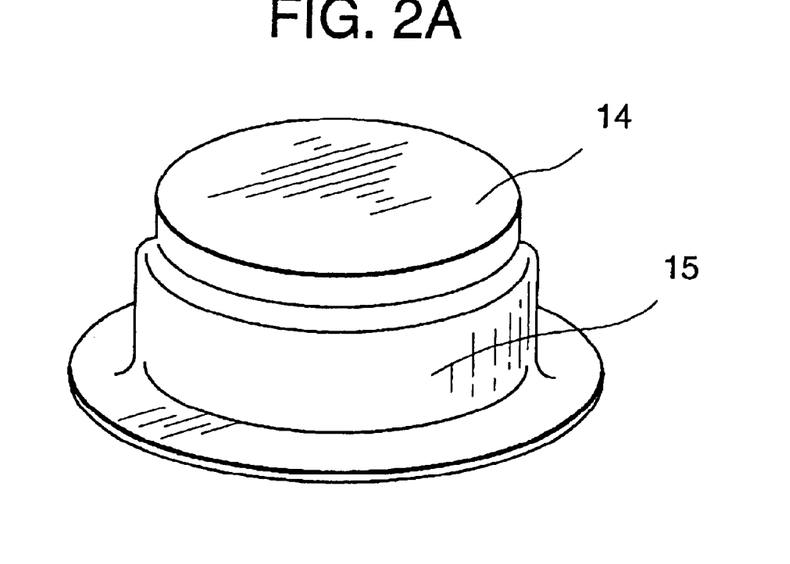
FIG. 2A is an external view of an ultrasonic transducer of the above embodiment of the present invention.
Figure 2B:
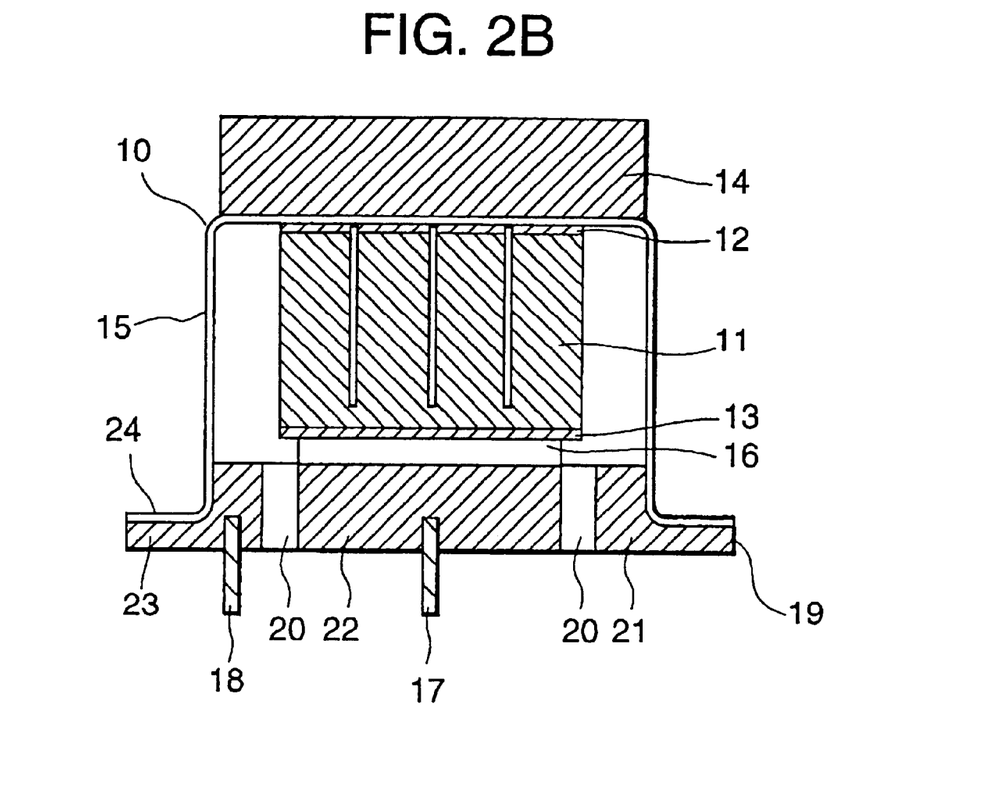
FIG. 2B is a cross-sectional view of the ultrasonic transducer of the above embodiment of the present invention.

Next, description will be given on the ultrasonic transducer used in the ultrasonic flowmeter. In order to improve the accuracy to measure the flowrate, it is preferable that the characteristics of a pair of the ultrasonic transducer are equalized with each other. However, when a method to solder lead wire, commonly known as the method for electrical connection, is adopted, frequency characteristics or transmitting/receiving sensitivity may be affected by thermal load or quantity of the solder used. In this respect, with the purpose of reducing the variations in frequency characteristics and improving transmitting/receiving sensitivity, the ultrasonic transducer as shown in FIG. 2 is adopted. In FIG. 2, an ultrasonic transducer 10 comprises a piezoelectric body 11 having electrode surfaces 12 and 13, a matching layer 14, a case 15 in cylindrical shape with ceiling and made of SUS (stainless steel), an electroconductive elastic body 16, and a terminal block 19 having two terminals 17 and 18. Each of the electrode surfaces 12 and 13 is designed in square shape with each side of about 7.6 mm. The matching layer 14 is about 11 mm in diameter, and diameter of a part of the case 15 near the ceiling is about 11 mm.

First the matching layer 14 and the electrode surface 12 of the piezoelectric body 11 are bonded to the ceiling of the case 15 made of SUS (stainless steel) and having thickness of 0.2 mm using epoxy type adhesive agent. By reducing the thickness of the adhesive agent, it is possible to achieve bonding and also to have electrical connection between the electrode surface 12 and the case 15. Next, the electroconductive elastic body 16 (e.g. electroconductive rubber made of silicone rubber) is sandwiched between the electrode surface 13 of the piezoelectric body 11 and the terminal 17 of the terminal block 19 and it is pressurized. Under this condition, outer peripheral portion 23 of the terminal block 19 is connected to outer peripheral portion 24 of the case 15 by electric welding.

Outer periphery 21 and the central portion 22 of the terminal block 19 are made of iron, for example. The terminal 18 is provided on the outer peripheral portion 21, and the terminal 17 is provided on the central portion 22. The outer peripheral portion 21 is electrically insulated by a glass material 20 from the central portion 22. As a result, the electrode surface 13 and the terminal 17 are electrically connected to each other. The electrode surface 12 is electrically connected to the terminal 18 via the case 15, which also serves as an external electrode, and via the outer peripheral portion 21 of the terminal block 19.

In the ultrasonic transducer 10 with the above arrangement, thermal influence and mechanical load are not given to the piezoelectric body 11. Therefore, if characteristics and dimensions of the piezoelectric body 11, the case 12 and the matching layer 14 are controlled well, the variations of the characteristics can be reduced, and it is possible to obtain a pair of ultrasonic transducer, which have identical characteristics. As a result, measuring accuracy of the ultrasonic flowmeter can be improved. Further, trouble due to disconnection can be decreased because no lead wire is used, and environmental problems caused by solder can be avoided.

In the embodiment as described above, electroconductive rubber made of silicone rubber is used as the elastic body 16, while other type of elastic material such as NBR rubber, liquid crystal polymer, etc. may be used so far as it is an elastic material having electroconductvity. In the above, LP gas is used as the fluid to be measured, while other type of gas such as city gas or air or liquid such as water may be used. In the above, frequency of the ultrasonic transducer 2 and 3 is set to 500 kHz, while frequency other than 500 kHz and suitable for measurement of the fluid to be measured may be selected. In the above, the ultrasonic transducer 2 and 3 are arranged obliquely with respect to the direction of the flow, while it may be arranged in parallel to the flow or may be arranged at such position that reflection from inner wall surface of the flowrate measuring unit 1 can be utilized. In the above, the outer peripheral portion 21 and the central portion 22 are electrically insulated by the glass material 20, while a material other than glass may be used so far as it is an insulating material. For example, resin such as epoxy resin may be used. Also, in the above, the piezoelectric body 11 is bonded to the ceiling of the case 15 designed in cylindrical shape, while it is not limited to the above condition. The case 15 may be designed in any shape other than the cylindrical shape with ceiling, or it may be arranged by bonding to outer wall surface of the flowrate measuring unit 1. The case 15 is used in a direction to transmit and receive ultrasonic wave, while it may be used in a direction opposite to the direction of transmitting and receiving. In the above, it is described that the ultrasonic transducer 2 and 3 are used in ultrasonic flowmeter, while it may be used in other applications such as ultrasonic transducer for flaw detection, ultrasonic probe for medical use, ultrasonic transducer for distance measurement, ultrasonic sonar for underwater measurement, etc. Further, if the air in the space defined by the case 15 and the terminal block 19 is replaced by nitrogen or inert gas, oxidation of electrode surfaces 12 and 13 and deterioration of the elastic body can be prevented, and this contributes to further improvement of reliability.

(Second Embodiment)

Figure 3:
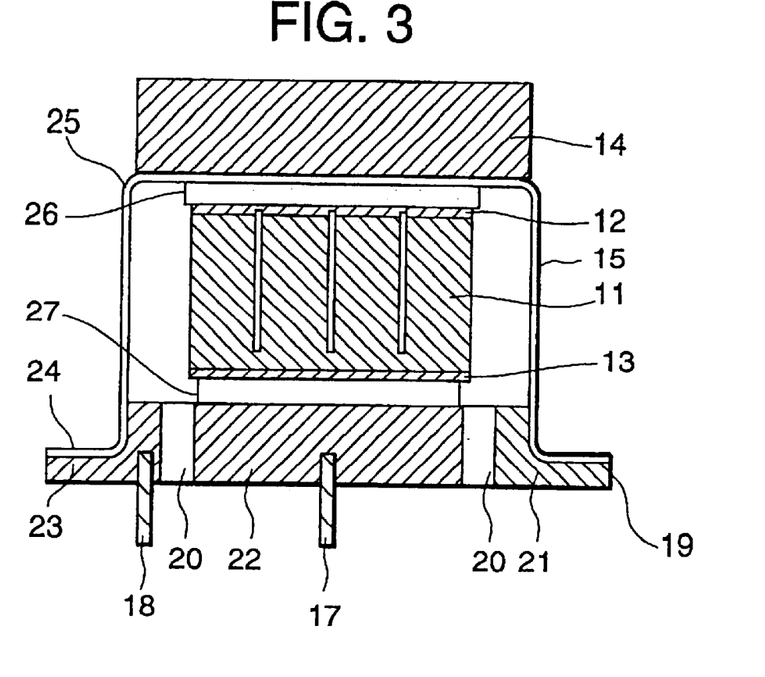
FIG. 3 is a cross-sectional view of an ultrasonic transducer of another embodiment of the present invention.

In the following, description will be given on another embodiment of the present invention referring to the drawing. FIG. 3 is a cross-sectional view of an ultrasonic transducer of the present embodiment. Reference numeral 25 represents an ultrasonic transducer, and it comprises a piezoelectric body 11 having electrode surfaces 12 and 13, a matching layer 14, a case 15, a terminal block 19 having two terminals 17 and 18, and a glass material 20 for electrically insulating the terminal 18 from the terminal 17. This arrangement is the same as shown in FIG. 2. It is different from the arrangement shown in FIG. 2 in that electroconductive elastic bodies 26 and 27 are used for electrically connecting the two electrode surfaces 12 and 13 of the piezoelectric body 11. Operation and functions of the ultrasonic flowmeter are the same as in the embodiment 1, and detailed description is not given here.

Description is given now on an example of a method to assemble the ultrasonic transducer 25 using electroconductive elastic body 26 instead of the bonding for electrical connection between the electrode surface 12 of the piezoelectric body 11 and the case 15. First, the matching layer 14 is bonded to the ceiling of the case 15 made of SUS (stainless steel) and having thickness of 0.2 mm using epoxy type adhesive agent, for example. Next, the electroconductive elastic body 26 (e.g. electroconductive rubber made of silicone rubber) is arranged on inner side of the case 15 so that the electrode surface 12 of the piezoelectric body 11 comes into contact with the elastic body 26. Then, the elastic body 27 (e.g. electroconductive rubber made of silicone rubber) is brought into contact with the electrode surface 13 of the piezoelectric body 11. The elastic body 27 is sandwiched by the electrode surface. 13 and the central portion 22 of the terminal of the terminal block 19 and is pressurized. Under this condition, outer periphery 23 of the terminal block 19 and outer periphery 24 of the case 15 are connected by electric welding. The outer peripheral portion 21 of the terminal block 19 and the central portion 22 are made of iron, for example. The terminal 18 and the terminal 17 are arranged on the outer peripheral portion 21 and the central portion 22 respectively. The outer peripheral portion 21 is electrically insulated from the central portion 22 by a glass material 20. As a result, the electrode surface 13 is electrically connected with the terminal 17, and the electrode surface 12 is electrically connected to the terminal 18 via the outer peripheral portion 21 of the terminal block 19.

In the ultrasonic transducer 25 as described above, electrical connection between the electrode surface 12 of the piezoelectric body 11 and the case 15 is achieved not by bonding but by the pressurizing connection using the elastic bodies 26 and 27. As a result, the variations of frequency characteristics and transmitting/receiving sensitivity caused by variation in the thickness of the adhesive agent can be reduced, and this makes It possible to attain the measurement with high accuracy.

In the present embodiment, electroconductive rubber made of silicone rubber is used as the elastic bodies 26 and 27, while any type of elastic material such as NBR rubber, liquid crystal polymer, etc. may be used so far as It is an electroconductive elastic body.

(Third Embodiment)

Figure 4:
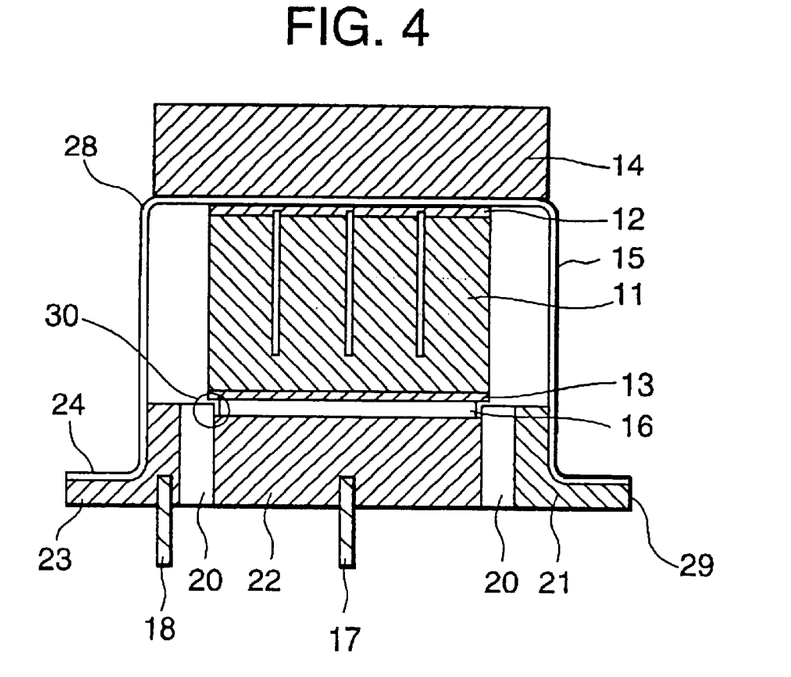
FIG. 4 is a cross-sectional view of an ultrasonic transducer of still another embodiment of the present invention.

In the following, description will be given on still another embodiment of the present invention referring to the drawing. FIG. 4 is a cross-sectional view of an ultrasonic transducer of the present embodiment. Reference numeral 28 represents an ultrasonic transducer, and it comprises a piezoelectric body 11 having electrode surfaces 12 and 13, a matching layer 14, a case 15, and an electroconductive elastic body 16, and this arrangement is the same as shown in FIG. 2. This arrangement is different from that of FIG. 2 in that a recess 30 is provided on a terminal block 29 having two terminals 17 and 18 as means for preventing the elastic body 16 from moving in lateral direction. Operation and functions of the ultrasonic flowmeter are the same as those of the embodiment 1, and detailed description is not given here.

First, the arrangement of the terminal block 29 is described. The outer peripheral portion 21 and the central portion 22 of the terminal block 29 are made of iron, for example, and the thickness of the central portion 22 is thinner than the thickness of the outer peripheral portion 21 so that the recess 30 is formed near the center of the terminal block 29. The outer peripheral portion 21 is electrically insulated from the central portion 22 by a glass material 20, and the thickness of the glass material 20 is approximately the same as the thickness of the outer peripheral portion 21. The terminal 18 is provided on the outer peripheral portion 21, and the terminal 17 is arranged on the central portion 22.

Description will be given now on an example of a method to assemble the ultrasonic transducer 28 using the terminal block 29 with the above arrangement. First, the matching layer 14 and the electrode surface 12 of the piezoelectric body 11 are bonded to the ceiling of the case 15 made of SUS (stainless steel) and having thickness of 0.2 mm using epoxy type adhesive agent, for example. In this case, by reducing the thickness of the adhesive agent, electrical connection between the electrode surface 12 and the case 15 is achieved at the same time as the bonding. Next, the elastic body 16 made of electroconductive rubber is moved down into the recess 30. This elastic body 16 is sandwiched by the electrode surface 13 and the central portion 22 and is pressurized. Under this condition, outer periphery 23 of the terminal block 29 is connected to the outer periphery 24 of the case 15 by electric welding.

In the ultrasonic transducer 28 with the above arrangement, moving of the elastic body 16 in lateral direction is prevented by the recess 30, and this contributes to the prevention of poor contact caused by the moving of the elastic body 16, and the reliability is improved. Further, the elastic body 16 is moved down into the recess 30 of the terminal block 29, and this makes it possible to prevent the moving of the elastic body 16 when the terminal block 29 is fixed, and also to facilitate the assembling procedure.

In the above embodiment, the thickness of the outer peripheral portion 21 is made approximately equal to the thickness of the glass material 20. If the outer peripheral portion 21 and the central portion 22 are not electrically short-circuited by the elastic body 16, there is no need to equalize the thickness. In the above, the recess 30 is formed by reducing the thickness of the central portion 22 more than that of the outer peripheral portion 21, while the recess may be provided at the central portion 22.

(Fourth Embodiment)

Figure 5:
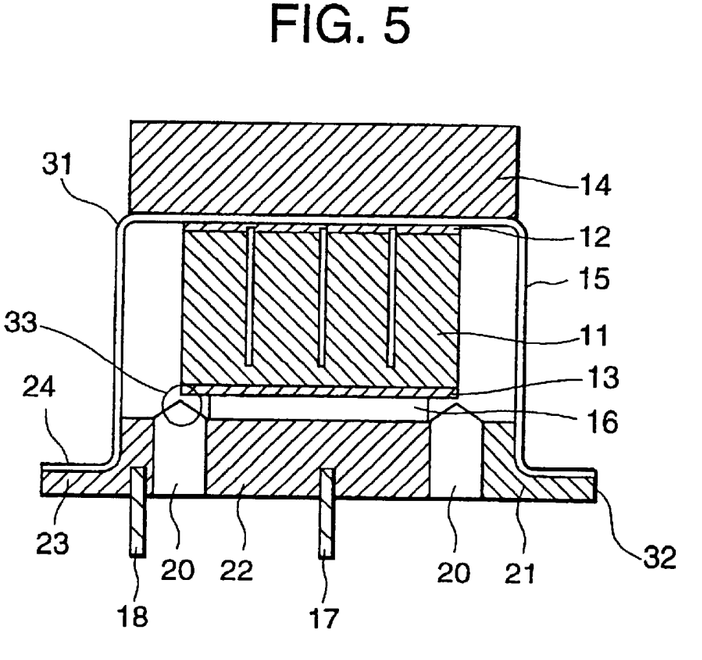
FIG. 5 is a cross-sectional view of an ultrasonic transducer of still another embodiment of the present invention.

In the following, description will be given on yet still another embodiment of the present invention referring to the drawing. FIG. 5 is a cross-sectional view of an ultrasonic transducer of the present embodiment. Reference numeral 31 represents an ultrasonic transducer, and it comprises a piezoelectric body 11 having electrode surfaces 12 and 13, a matching layer 14, a case 15, and an electroconductive elastic body 16. This arrangement is the same as shown in FIG. 2. It is different from the arrangement of FIGS. 2A and 2B in that a projection 33 is provided on the terminal block 32 having two terminals 17 and 18 as means for preventing the elastic body 16 from moving in lateral direction. Operation and functions of the ultrasonic flowmeter are not described here as these are the same as in the embodiment 1.

First, the arrangement of the terminal block 32 is described. Outer peripheral portion 21 and the central portion 22 of the terminal block 32 are made of iron, for example, and the outer peripheral portion 21 is electrically insulated from the central portion 22 by a glass material 20. The glass material 20 has smaller thickness than the thickness of the outer peripheral portion 21 and the central portion 22 so that the projection 33 is provided on the terminal block 32. The terminal 18 is arranged on the outer peripheral portion 21, and the terminal 17 is arranged on the central portion 22.

Description will be given now on an example of a method to assemble the ultrasonic transducer 31 using the terminal block 32 with the above arrangement. First, the matching layer 14 and the electrode surface 12 of the piezoelectric body 11 are bonded to the ceiling of the case 15 made of SUS (stainless steel) and having thickness of 0.2 mm using epoxy type adhesive agent, for example. In this case, by reducing the thickness of the adhesive agent, electrical connection for the electrode surface 12 and the case 15 is achieved at the same time as the bonding. Next, an elastic body 16 made of electroconductive rubber is arranged on inner side of the projection 33 of the terminal block 32. This elastic body 16 is sandwiched by the electrode surface 13 and the central portion 22 and is pressurized. Under this condition, the outer periphery 23 of the terminal block 32 and outer periphery 24 of the case 15 are connected by electric welding.

In the ultrasonic transducer 31 with the above arrangement, the moving of the elastic body 16 in lateral direction is prevented by the projection 33. This makes it possible to prevent poor contact caused by the moving of the elastic body 16 and to improve the reliability. Further, because the elastic body 16 is moved down to the projection 33 of the terminal block 32, the moving of the elastic body 16 is prevented when the terminal block 32 is fixed, and this facilitates assembling procedure.

In the above embodiment, the projection is formed on the glass material 20, while the projection may be provided on outer periphery of the central portion 22, and the central portion 22 may be insulated from the outer peripheral portion 21.

(Fifth Embodiment)

Figure 6:
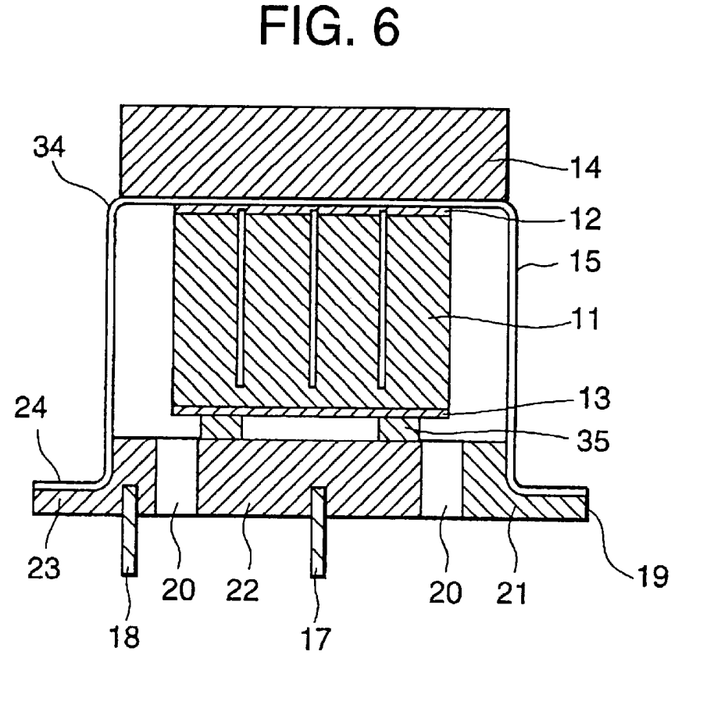
FIG. 6 is a cross-sectional view of an ultrasonic transducer of yet still another embodiment of the present invention.

In the following, description will be given on still another embodiment of the present invention referring to the drawing. FIG. 6 is a cross-sectional view of an ultrasonic transducer of the present embodiment. Reference numeral 34 represents an ultrasonic transducer, and it comprises a piezoelectric body 11 having electrode surfaces 12 and 13, a matching layer 14, a case 15, and a terminal block 19 having two terminals 17 and 18. This arrangement is the same as shown in FIG. 2. It is different from the arrangement of FIG. 2 in that a conductive unit 36 and an insulating units 37 are arranged on the electroconductive elastic body 35. Operation and functions of the ultrasonic flowmeter are not described here because these are the same as in the embodiment 1.

Figure 7:
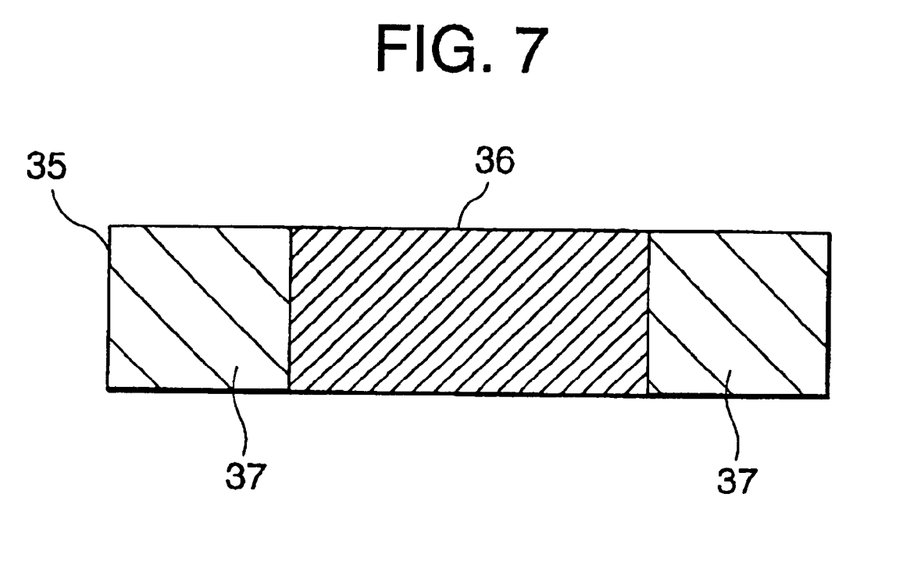
FIG. 7 is a cross-sectional view of an electroconductive elastic body of an embodiment of the present invention.

First, the arrangement of the electroconductive elastic body 35 will be described referring to the drawing. FIG. 7 is a cross-sectional view of the electroconductive elastic body 35. The conductive unit 36 is made of electroconductive silicone rubber, and an insulating unit 37 made of insulating silicone rubber is arranged to enclose the conductive unit 36.

Description will be given now on an example of a method to assemble the ultrasonic transducer 34 using the elastic body 35 as described above. First, the matching layer 14 and the electrode surface 12 of the piezoelectric body 11 are bonded to the ceiling of the case 15 made of SUS (stainless steel) and having thickness of 0.2 mm using epoxy type adhesive agent, for example. In this case, by reducing the thickness of the adhesive agent, electrical connection of the electrode surface 12 and the case 15 can be achieved at the same time as the bonding. Next, the electroconductive elastic body 35 is sandwiched by the electrode surface 13 of the piezoelectric body 11 and the central portion 22 of the terminal block 19 and is pressurized. Under this condition, the outer periphery 23 of the terminal block 19 and the outer periphery 24 of the case 15 are connected by electric welding. The outer peripheral portion 21 and the central portion 22 of the terminal block 19 are made of iron, for example. The terminal 18 is arranged on the outer peripheral portion 21, and the terminal 17 is arranged on the central portion 22. The outer peripheral portion 21 is electrically insulated from the central portion 22 by the glass material 20. As a result, the electrode surface 13 is electrically connected to the terminal 17, and the electrode surface 12 is electrically connected to the terminal 18 via the case 15, which also serves as an external electrode, and via the outer peripheral portion 21 of the terminal block 19.

In the ultrasonic transducer 34 with the above arrangement, an insulating unit 37 is provided on outer periphery of the elastic body 35 used for electrical connection, and this makes it possible to prevent electric short-circuiting of two external electrodes even when there is deviation in the position of the elastic body 35 in the assembling process. This contributes to the reduction of trouble caused by electric short-circuiting, facilitates the assembling, and improves the reliability.

Figure 8:
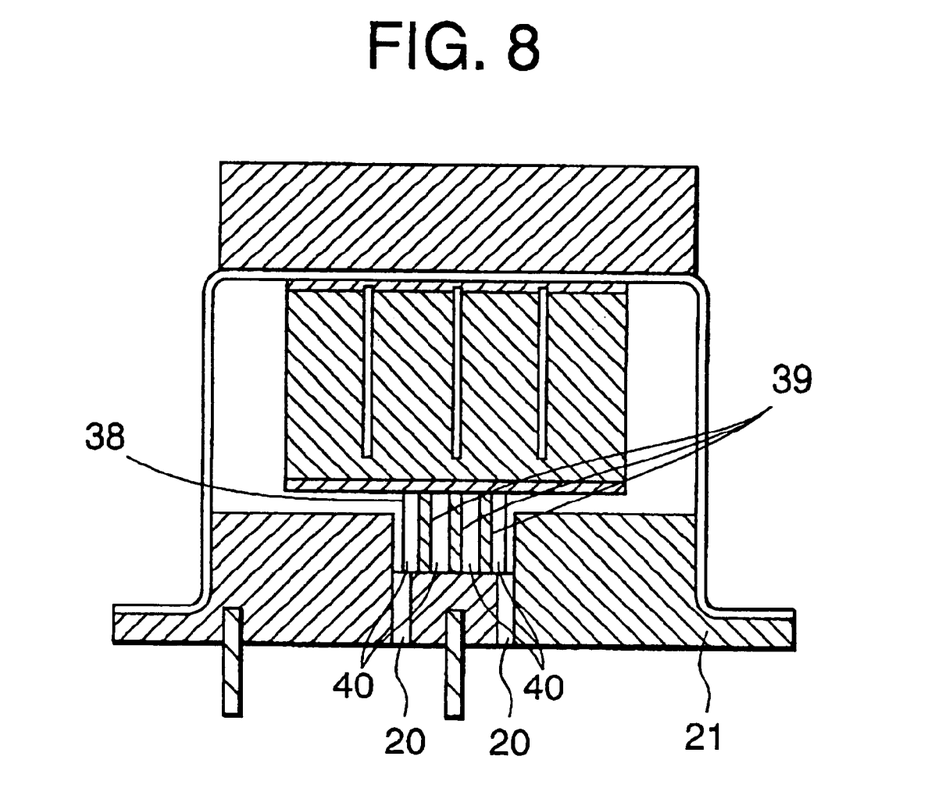
FIG. 8 is a cross-sectional view of a variation of an ultrasonic transducer of an embodiment of the present invention.

In the above embodiment, electroconductive rubber made of silicone rubber is used as the material for the conductive unit 36, while any type of elastic material such as NBR rubber, liquid crystal polymer, etc. may be used so far as it is an electroconductive elastic material. Also, in the above, silicone rubber having insulating property is used as the material for the insulating unit 37, while other type of insulating material may be used. In the above, it is designed in such manner that the insulating unit 37 encloses the conductive unit 36 in the electroconductive elastic body 35, while it may be designed as an elastic body 38 as shown in FIG. 8, i.e. a conductive layer 39 and an insulating layer 40 are alternately arranged in layers to maintain the elasticity. Further, as shown in FIG. 8, if the outermost layer of the elastic body 38 is designed as the insulating layer 39, it is possible to prevent electric short-circuiting of the two external electrodes even when the thickness of the glass material 20 is decreased more than the thickness of the outer peripheral portion 21.

In the above embodiments 1 to 5, the matching layer 14 is arranged on the case 15, while there may be no need to provide the matching layer 14 depending upon the type of the fluid to be measured. In the above, the case 15 is made of SUS (stainless steel), while other metal such as iron, aluminum, brass, copper, etc. may be used, or resin such as epoxy resin having an electrode on the surface may be used. In the above, the outer peripheral portion 21 and the central portion 22 of the terminal block are made of iron, while other metal such as SUS (stainless steel), aluminum, brass, copper, etc. may be used, or resin such as epoxy resin with an electrode on the surface may be used. In the above, the outer periphery 23 of the terminal block is electrically welded to the outer periphery 24 of the case, while welding other than electric welding or bonding may be adopted.

As it is evident from the above description, the following effects can be obtained by the present invention:

The ultrasonic transducer for transmitting and receiving ultrasonic wave according to the present invention comprises a piezoelectric body having electrode surfaces on two opposed surfaces, and an external electrode unit for transmitting an electric signal to the piezoelectric body, whereby one of the electrode surfaces of the piezoelectric body and the external electrode unit are electrically connected via an electroconductive elastic body. As a result, frequency characteristics are equalized with each other because there is no thermal load due to soldering, and environmental load can be reduced.

The ultrasonic transducer according to another aspect of the present invention comprises two external electrode units, one of the electrode surfaces of a piezoelectric body is electrically connected to the other of the external electrode units via an electroconductive elastic body, and the other of the electrode surfaces of the piezoelectric body is electrically connected to the other of the external electrode units by bonding, whereby frequency characteristics are equalized with each other because there is no thermal loading due to soldering, and environmental load is reduced.

The ultrasonic transducer according to another aspect of the present invention comprises two external electrode units, each of the electrode surfaces of the piezoelectric body is electrically connected to each of the external electrode units via an electroconductive elastic body, whereby environmental load due to soldering is reduced, variations in the frequency characteristics and transmitting/receiving sensitivity caused by variation of thickness of adhesive agent are reduced, and measurement can be performed with high accuracy.

In the ultrasonic transducer according to another aspect of the present invention, the electrode surface of the piezoelectric body and the external electrode unit are electrically connected by sandwiching and pressurizing the electroconductive elastic body whereby variations of frequency characteristics can be reduced because there is no thermal load due to soldering; and an ultrasonic transducer can be easily assembled.

The ultrasonic transducer according another aspect of the present invention comprises a terminal block having two electrically separated terminals, the two terminals are electrically connected to each of the external electrode units, and an ultrasonic transducer easily connectable with external device using lead wire can be obtained.

The ultrasonic transducer according another aspect of the present invention comprises means for preventing the electroconductive elastic body from moving in lateral direction, and disconnection due to the moving of the electroconductive elastic body can be prevented, and an ultrasonic transducer with high reliability can be obtained.

In the ultrasonic transducer according to another aspect of the present invention, the movement preventing means is a recess arranged on the terminal block, and the electroconductive elastic body and one of the external electrode units are arranged on inner side of the recess, and if the electroconductive elastic body is moved down into the recess, poor connection due to the moving of the electroconductive elastic body in lateral direction can be prevented, and an ultrasonic transducer with high reliability can be obtained. Further, an ultrasonic transducer easy to assemble can be obtained because the moving of the electroconductive elastic body can be prevented.

In the ultrasonic transducer according to another aspect of the present invention, the means for preventing the moving is a projection provided on the terminal block, the electroconductive elastic body and one of the external electrode units are arranged on inner side of the projection, and if the projection is arranged to prevent the electroconductive elastic body from moving, poor contact caused by the moving of the electroconductive elastic body in lateral direction can be prevented, and an ultrasonic transducer with high reliability can be obtained. Further, an ultrasonic transducer easy to assemble can be obtained because the moving of the electroconductive elastic body can be prevented by the projection.

In the ultrasonic transducer according to another aspect of the present invention, the electroconductive elastic body comprises an electroconductive unit and an insulating unit, and electric short-circuiting of two external electrodes can be prevented by the insulating unit, and an ultrasonic transducer with high reliability can be obtained.

In the ultrasonic transducer according to another aspect of the present invention, the conductive unit and the insulating unit are arranged alternately in layers, and the outermost layers on both sides are insulating layers, electrical short-circuiting of the two external electrodes can be prevented by the insulating unit, and trouble caused by electrical short-circuiting can be prevented, and an ultrasonic transducer easy to assemble and with high reliability can be obtained.

In the ultrasonic transducer according to another aspect of the present invention, at least one of the external electrode units has a bent portion, which increases the degree of freedom at the point where the external electrode is fixed, and an ultrasonic transducer easy to assemble can be obtained.

The ultrasonic flowmeter according to the present invention comprises a flowrate measuring unit where a fluid to be measured is flowing; a pair of ultrasonic transducer having a piezoelectric body having electrode surfaces on two opposed surfaces, and an external electrode unit for transmitting an electric signal to said piezoelectric body, one of the electrode surfaces of the piezoelectric body being electrically connected to the external electrode unit via an electroconductive elastic body, said pair of ultrasonic transducer being arranged on said flowrate measuring unit; a driving circuit for driving one of the ultrasonic transducer; a receiving detection circuit connected to the other of the ultrasonic transducer and for detecting ultrasonic pulse; a timer for measuring propagation time of the ultrasonic pulse; and an arithmetic unit for calculating flowrate based on the output of the timer. As a result, the characteristics of a pair of ultrasonic transducer can be easily equalized, and an ultrasonic flowmeter with high measuring accuracy can be obtained.

The above-described embodiments are examples of the present invention, and therefore, the scope of the invention is not limited to these embodiments, and it is apparent for those skilled in the art that various modifications and variations may be made without departing from the scope of the invention defined by claims.

What is claimed is:

1. An ultrasonic transducer for transmitting and receiving ultrasonic waves, comprising:

a piezoelectric body having two opposed surfaces;

first and second electrodes respectively on said two opposed surfaces;

an electroconductive elastic body having flat opposed surfaces; and an external electrode unit for transmitting an electric signal to said piezoelectric body, said external electrode unit comprising:

a first portion that is electrically connected to one of said surfaces of said piezoelectric body via said electroconductive elastic body and said first electrode, wherein substantially the entire face of one of said flat opposed surfaces of said electroconductive elastic body is in contact with substantially the entire face of a flat surface of said first portion, and substantially the entire face of the other of said flat opposed surfaces is in contact with substantially the entire face of a flat surface of said first electrode;

a second portion that is secured to said second electrode and is electrically connected to the other of said surfaces of said piezoelectric body via said second electrode;

a third portion that is mechanically connected to, but electrically insulated from, said second portion;

securing means for securing said first portion to said third portion by compressing said electroconductive elastic body, thereby sandwiching said electroconductive elastic body under pressure between said first portion and said first electrode, and means for biasing said first portion toward said second portion with a compressive force exerted by said electroconductive elastic body, thereby applying biasing forces to electrical connecting portions between said electroconductive elastic body and said first electrode, and between said electroconductive elastic body and said first portion.

2. The ultrasonic transducer according to claim 1, wherein said external electrode unit comprises two external electrodes, one of the electrode surfaces of said piezoelectric body is electrically connected to one of said external electrodes via an electroconductive elastic body, and the other of the electrode surfaces of said piezoelectric body is electrically connected to the other of said external electrodes by bonding.

3. The ultrasonic transducer according to claim 2, further comprising a terminal block comprising two electrically separated terminals electrically connected to said external electrode units respectively.

4. The ultrasonic transducer according to claim 3, further comprising means for preventing said electroconductive elastic body from moving in a lateral direction, said means being located on said terminal block.

5. The ultrasonic transducer according to claim 4, wherein said means for preventing movement of the electroconductive elastic body comprises said terminal block including a recess therein, and said electroconductive elastic body and one of said external electrode units are located on an inner side of said recess.

6. The ultrasonic transducer according to claim 4, wherein said means for preventing movement of the electroconductive elastic body comprises a projection located on said terminal block, and said electroconductive elastic body and one of said external electrode units are located on an inner side of said projection.

7. The ultrasonic transducer according to claim 2, wherein said electroconductive elastic body comprises a conductive unit and an insulating unit, and said insulating unit is for preventing electrical short-circuit between said two external electrodes.

8. The ultrasonic transducer according to claim 7, wherein said conductive unit and said insulating unit are located alternately in layers, and the outermost layers on both sides are insulating layers.

9. The ultrasonic transducer according to claim 1, wherein said external electrode unit comprises two external electrodes, and each of the electrode surfaces of said piezoelectric body is electrically connected to each of said external electrodes via an electroconductive elastic body.

10. The ultrasonic transducer according to claim 1, wherein the electrode surface of said piezoelectric body and a mating surface of said external electrode unit are held together in electrical contact by a compressive force exerted by an electroconductive elastic body.

11. The ultrasonic transducer according to claim 1, wherein said external electrode unit comprises two external electrodes, and at least one of said external electrodes comprises a bent portion for increasing degrees of freedom at an attachment point of said one of said external electrodes.

12. An ultrasonic flowmeter, comprising:

a flowrate measuring unit;

a pair of ultrasonic transducers each comprising a piezoelectric body having two opposed surfaces;

first and second electrodes respectively located on said two opposed surfaces;

an electroconductive elastic body having flat opposed surfaces; and an external electrode unit for transmitting an electric signal to said piezoelectric body, said external electrode unit comprising:

a first portion that is electrically connected to one of said surfaces of said piezoelectric body via said electroconductive elastic body and said first electrode, wherein substantially the entire face of one of said flat opposed surfaces of said electroconductive elastic body is in contact with substantially the entire face of a flat surface of said first portion, and substantially the entire face of the other of said flat opposed surfaces is in contact with substantially the entire face of a flat surface of said first electrode;

a second portion that is secured to said second electrode and is electrically connected to the other of said surfaces of said piezoelectric body via said second electrode;

securing means for securing said first portion to said second portion, which is mechanically connected to, but insulated from, said second portion, by compressing said electroconductive elastic body, thereby sandwiching said electroconductive elastic body under pressure between said first portion and said first electrode, and means for biasing said first portion toward said second portion with a compressive force exerted by said electroconductive elastic body, thereby applying biasing forces to electrical connecting portion between said electroconductive elastic body and said first electrode, and between said electroconductive elastic body and said first portion;

said pair of ultrasonic transducers located on said flowrate measuring unit;

a driving circuit for driving one of said ultrasonic transducers for detecting ultrasonic pulse;

a receiving detection circuit connected to the other of said ultrasonic transducer and for detecting ultrasonic pulse;

a timer connected to the driving circuit for measuring propagation time of an ultrasonic pulse; and an arithmetic unit for calculating flowrate from output of said timer.

* * * * *